US012663635B2

(12) United States Patent 
Kraemer et al.

(10) Patent No.: US 12,663,635 B2 
(45) Date of Patent: Jun. 23, 2026

(54) ADAPTIVE APPEARANCE

(71) Applicant: KA Dynamic Color Ltd., Yokneam Ilit (IL)

(72) Inventors: Arnon Kraemer, Tel Aviv (IL); Alexei Lee, Yokneam Illit (IL)

(73) Assignee: KA Dynamic Color Ltd., Yokneam Ilit (IL)

( * ) Notice: Subject to any disclaimer, the term of this patent is extended or adjusted under 35 U.S.C. 154(b) by 0 days.

(21) Appl. No.: 19/101,898

(22) PCT Filed: Aug. 7, 2023

(86) PCT No.: PCT/IL2023/050816
§ 371 (c)(1),
(2) Date: Feb. 7, 2025

(87) PCT Pub. No.: WO2024/033915
PCT Pub. Date: Feb. 15, 2024

(65) Prior Publication Data
US 2026/0009997 A1 Jan. 8, 2026

(30) Foreign Application Priority Data

Aug. 7, 2022 (IL) ........................................ 295430

(51) Int. Cl.
*G02B 26/00* (2006.01)
*G02B 7/00* (2021.01)
(52) U.S. Cl.
CPC ........... *G02B 26/008* (2013.01); *G02B 7/006* (2013.01)

(58) Field of Classification Search
CPC ..... G02B 26/008; G02B 7/006; G02B 26/023
See application file for complete search history.

(56) References Cited

U.S. PATENT DOCUMENTS

| | | | | |
|---|---|---|---|---|
| 5,764,823 | A | * 6/1998 | Shapanus | G01R 31/346 |
| | | | | 385/16 |
| 2003/0184870 | A1* | 10/2003 | Shioya | H04N 9/3114 |
| | | | | 348/335 |
| 2003/0227450 | A1 | 12/2003 | Satoh et al. | |
| 2005/0141117 | A1 | 6/2005 | Kim et al. | |
| 2013/0258442 | A1* | 10/2013 | Kraemer | G02B 26/007 |
| | | | | 359/290 |

(Continued)

FOREIGN PATENT DOCUMENTS

WO WO 2020/002975 1/2020

OTHER PUBLICATIONS

International Preliminary Report on Patentability Dated Feb. 20, 2025 From the International Bureau of WIPO Re. Application No. PCT/IL2023/050816 (6 Pages).

(Continued)

*Primary Examiner* — Joseph P Martinez

(57) ABSTRACT
The invention relates to an electro-mechanical pixel having a storage compartment that has a plurality of filters; an exhibit area configured to allow one or more of the plurality filter to be seen; an electronic module having one or more motors configured for independently moving each filter from within the storage compartment into the exhibit area and circuitry configured to actuate the one or more motors; where the storage compartment and the electronic module being mechanically connected to each other by at least one connector.

19 Claims, 8 Drawing Sheets

(56)            References Cited

U.S. PATENT DOCUMENTS

2019/0312184 A1    10/2019   Otto et al.

OTHER PUBLICATIONS

International Search Report and the Written Opinion Dated Oct. 31, 2023 From the International Searching Authority Re. Application No. PCT/IL2023/050816 (10 Pages).

Office Action Dated Dec. 18, 2024 From the Israel Patent Office Re. Application No. 295430. (3 Pages).

Xu et al. "Adaptive Infrared-Reflecting Systems Inspired by Cephalopods", Science, 359(6383): 1495-1500, Mar. 30, 2018.

Zhu et al. "Multispectral Camouflage for Infrared, Visible, Lasers and Microwave With Radiative Cooling", Nature Communications, 12(1): 1805-1-1805-8, Mar. 22, 2021.

\* cited by examiner

100
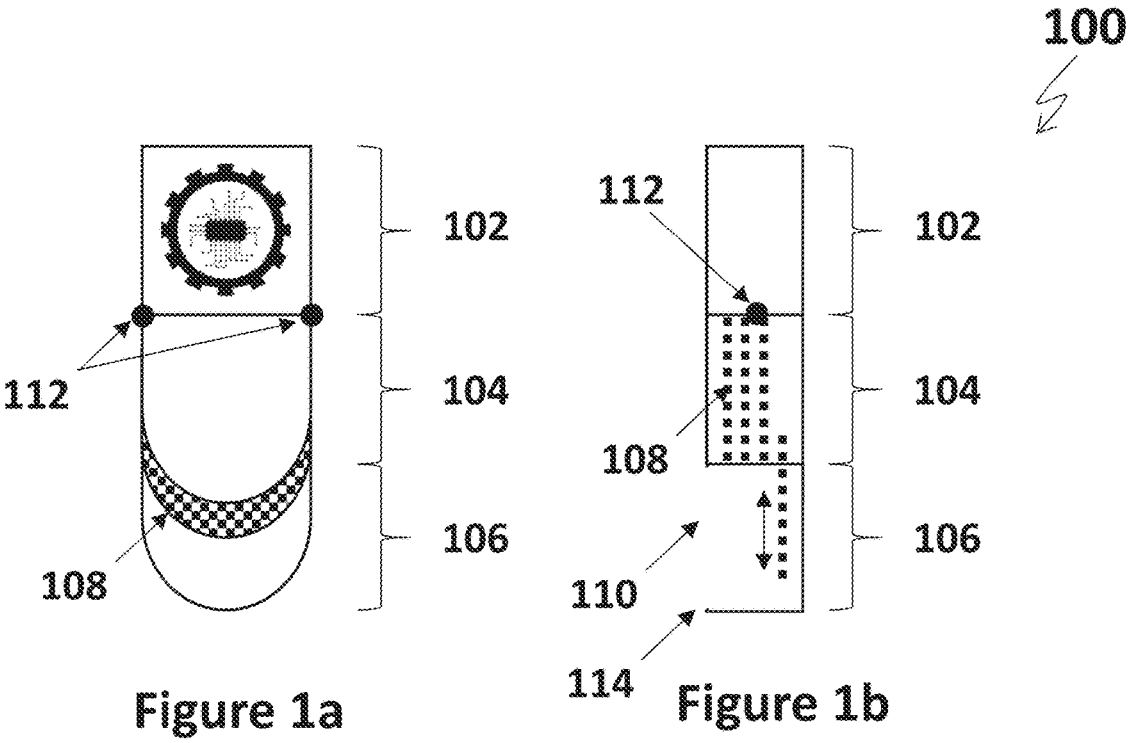
Figure 1a
Figure 1b
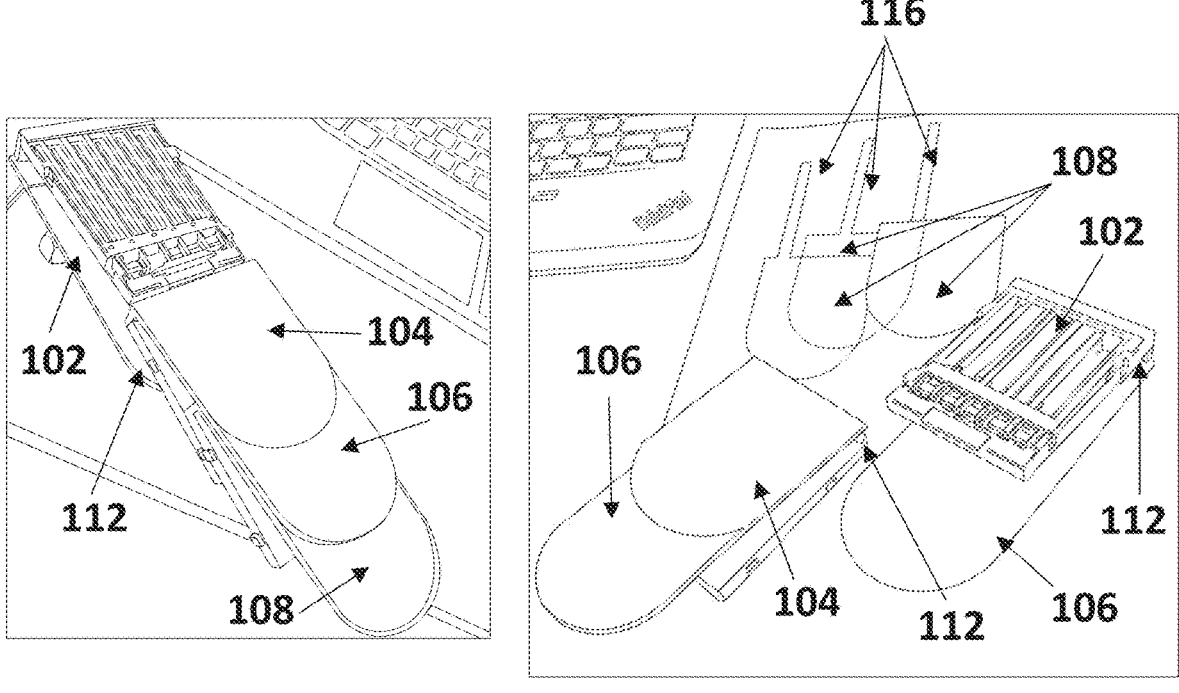
Figure 1c
Figure 1d

Schematic perspective
exploded view

Schematic top view

ADAPTIVE APPEARANCE

RELATED APPLICATIONS

This application is a National Phase of PCT Patent Application No. PCT/IL2023/050816 having International filing date of Aug. 7, 2023, which claims the benefit of priority of Israeli Patent Application No. 295430, filed on Aug. 7, 2022. The contents of the above applications are all incorporated by reference as if fully set forth herein in their entirety.

FIELD AND BACKGROUND OF THE INVENTION

The present invention, in some embodiments thereof, relates to an electro-mechanical pixel and, more particularly, but not exclusively, to an electro-mechanical adaptive pixel.

Additional background art includes U.S. Pat. No. 9,329,380B2 disclosing a display board including a plurality of display devices or tiles that include a casing and a plurality of light manipulating elements disposed within and along a side of the casing, such that the one or more light manipulating elements are adapted to form at least one pixel. The display device or tile further includes at least one or more rods coupled to the plurality of one or more light manipulating elements, and a liquid disposed within the casing, wherein the liquid is adapted to flow within the casing for imparting motion onto the one or more rods for changing the pigment of the at least one pixel.

SUMMARY OF THE INVENTION

Following is a non-exclusive list including some examples of embodiments of the invention. The invention also includes embodiments which include fewer than all the features in an example and embodiments using features from multiple examples, also if not expressly listed below.

Example 1. An electro-mechanical pixel, comprising:
a. a storage compartment comprising a plurality of filters;
b. an exhibit area configured to allow one or more of said plurality filter to be seen;
c. an electronic module, comprising:
i. one or more motors configured for independently moving each filter from said plurality of filters from within said storage compartment into said exhibit area;
ii. circuitry configured to actuate said one or more motors;
wherein said storage compartment and said electronic module being mechanically connected to each other by at least one connector.

Example 2. The electro-mechanical pixel according to example 1, wherein said exhibit area comprises a housing; said housing comprising at least one opening configured to allow said filters residing within said first housing to be seen.

Example 3. The electro-mechanical pixel according to example 1 or example 2, wherein said at least one connector is at least one hinge located between said storage compartment and said electronic module.

Example 4. The electro-mechanical pixel according to any one of examples 1-3, wherein said at least one connector is a bendable connector configured to allow arrangement of said storage compartment and said electronic module at an angle of between about 0 degrees and about 180 degrees.

Example 5. The electro-mechanical pixel according to any one of examples 1-4, wherein movement of said plurality of filters is characterized by being a linear movement.

Example 6. The electro-mechanical pixel according to example 5, wherein said movement allows said filters cover between 0% and 100% of an area of said exhibit area.

Example 7. The electro-mechanical pixel according to any one of examples 1-6, further comprising a cover element.

Example 8. The electro-mechanical pixel according to any one of examples 1-7, wherein said plurality of filters are chromatic filters.

Example 9. The electro-mechanical pixel according to any one of examples 1-8, wherein said plurality of filters are configured to provide one or more colors.

Example 10. The electro-mechanical pixel according to example 9, wherein said one or more colors are selected from the group consisting of green, red, blue, yellow, cyan and magenta.

Example 11. The electro-mechanical pixel according to any one of examples 1-10, wherein said plurality of filters comprise one or more of polarizers, reflective filters, refractive filters and optical elements.

Example 12. The electro-mechanical pixel according to any one of examples 1-11, wherein each filter from said plurality of filters is characterized by a percentage of transmission for all of the wavelength ranges but one.

Example 13. The electro-mechanical pixel according to any one of examples 1-12, wherein each filter from said plurality of filters is characterized by a 100% transmission for one wavelength range.

Example 14. The electro-mechanical pixel according to any one of examples 1-13, wherein combinations between said filters from said plurality of filters allows said pixel to provide a transmission between 0% and 100% for each wavelength range.

Example 15. The electro-mechanical pixel according to any one of examples 1-14, further comprising at least one background filter positioned behind said filters in said exhibit area.

Example 16. The electro-mechanical pixel according to example 15, wherein said background filter comprises a color selected from the group consisting of white, black, gray and shades in between.

Example 17. The electro-mechanical pixel according to any one of examples 1-16, wherein said plurality of filters are made of materials having different levels of emissivity.

Example 18. The electro-mechanical pixel according to example 17, wherein said levels of emissivity are from about 0.01 to about 0.99.

Example 19. The electro-mechanical pixel according to example 17, wherein said plurality of filters are provided with different levels of roughness to amend said levels emissivity.

Example 20. The electro-mechanical pixel according to any one of examples 1-19, wherein said plurality of filters comprise thin sheets made of at least one material configured to be semi-transparent in the infrared spectrum.

Example 21. The electro-mechanical pixel according to example 20, wherein said at least one material being semi-transparent in the infrared spectrum provides reduced emissivity to said plurality of filters.

Example 22. The electro-mechanical pixel according to example 20, wherein said at least one material are plastic materials.

Example 23. The electro-mechanical pixel according to example 17, wherein said materials are one or more of alumel, aluminum, aluminum oxide, asbestos, asphalt, basalt, bismuth, brass, carbon, carborundum, ceramic, clay, concrete, chromel, chromium, cobalt, columbium, copper, enamel, formica, mullite, glass, gold, granite, gravel, gypsum, iron, iron oxide, lacquer, lead, limestone, magnesium oxide, molybdenum, monel, nichrome, nickel, nickel oxide, oil, paint, paper, plaster, plastic, platinum, polyester, polyethylene, quartz, rubber, sand, sandstone, shale, silica, silicone carbide, silver, slate, stainless steel, steel, tantalum, textiles, tine, tungsten, wood and zinc.

Example 24. The electro-mechanical pixel according to any one of examples 1-23, wherein said plurality of filters are made of materials that are one or more of microwave absorbers and microwave reflective.

Example 25. The electro-mechanical pixel according to any one of examples 1-24, wherein said plurality of filters are made of materials comprising embedded micro and/or macro materials, like crystals, metals, polymers and fibers.

Example 26. The electro-mechanical pixel according to any one of examples 1-25, wherein said plurality of filters are configured to provide said pixel with either a higher or a lower radar cross-section.

Example 27. An electro-mechanical pixel, comprising:
  a. a storage compartment comprising:
    i. a plurality of filters;
    ii. an electronic module
  b. an exhibit area configured to allow one or more of said plurality filter to be seen;
wherein said each filter from said plurality of filters is configured to cover at least 80% of an area of said exhibit area.

Example 28. An electro-mechanical pixel, comprising:
  a. a storage compartment comprising:
    i. a plurality of filters;
    ii. an electronic module
  b. an exhibit area configured to allow one or more of said plurality filter to be seen;
wherein said pixel is flat, thin and has a wide exhibit area;
wherein a relation between a thickness of said storage compartment and a surface of said exhibit area is from about 1:10 to about 1:1000;
  wherein a total thickness of said pixel is less than surface area of said exhibit area.

Example 29. A shell-like or tube electro-mechanical pixel, comprising:
  a. a storage compartment comprising:
    i. a plurality of filters;
    ii. an electronic module, comprising:
      A. one or more motors configured for independently moving each filter from said plurality of filters from within said storage compartment into an exhibit area;
      B. circuitry configured to actuate said one or more motors;
  b. an exhibit area configured to allow one or more of said plurality filter to be seen;
wherein movement of said plurality of filters from said storage compartment to said exhibit area is characterized by a rotational movement along a longitudinal axis of the pixel, which is parallel to a direction of a surface of said storage compartment.

Example 30. The shell-like or tube electro-mechanical pixel according to example 29, wherein said storage compartment comprises a housing sized and shaped to store said a plurality of filters and said electronic module.

Example 31. The shell-like or tube electro-mechanical pixel according to example 29 or example 30, further comprising a central shaft located in said storage compartment.

Example 32. The shell-like or tube electro-mechanical pixel according to example 31, wherein said central shaft is positioned along said longitudinal axis.

Example 33. The shell-like or tube electro-mechanical pixel according to example 31, wherein said rotational rotation is performed over said central shaft.

Example 34. The shell-like or tube electro-mechanical pixel according to any one of examples 29-33, wherein said plurality of filters are sized and shaped to fit a form of said storage compartment.

Example 35. The shell-like or tube electro-mechanical pixel according to any one of examples 29-34, wherein said rotational movement allows one or more of said plurality of filters to cover between 0% and 100% of said exhibit area.

Example 36. The shell-like or tube electro-mechanical pixel according to any one of examples 29-35, wherein said exhibit area further comprise a neutral protective layer configured to protect said plurality of filters when located in said exhibit area.

Example 37. The shell-like or tube electro-mechanical pixel according to any one of examples 29-36, wherein said pixel comprises a form of a shell or a form of a tube.

Example 38. The electro-mechanical pixel according to any one of examples 29-37, wherein said plurality of filters are chromatic filters.

Example 39. The electro-mechanical pixel according to any one of examples 29-38, wherein said plurality of filters are configured to provide one or more colors.

Example 40. The electro-mechanical pixel according to example 39, wherein said one or more colors are selected from the group consisting of green, red, blue, yellow, cyan and magenta.

Example 41. The electro-mechanical pixel according to any one of examples 29-40, wherein said plurality of filters comprise one or more of polarizers, reflective filters, refractive filters and optical elements.

Example 42. The electro-mechanical pixel according to any one of examples 29-41, wherein each filter from said plurality of filters is characterized by a percentage of transmission for all of the wavelength ranges but one.

Example 43. The electro-mechanical pixel according to any one of examples 29-42, wherein each filter from said plurality of filters is characterized by a 100% transmission for one wavelength range.

Example 44. The electro-mechanical pixel according to any one of examples 29-43, wherein combinations between said filters from said plurality of filters allows said pixel to provide a transmission between 0% and 100% for each wavelength range.

Example 45. The electro-mechanical pixel according to any one of examples 29-44, further comprising at least one background filter positioned behind said filters in said exhibiting area.

Example 46. The electro-mechanical pixel according to example 45, wherein said background filter comprises a color selected from the group consisting of white, black, gray and shades in between.

Example 47. The electro-mechanical pixel according to any one of examples 29-46, wherein said plurality of filters are made of materials having different levels of emissivity.

Example 48. The electro-mechanical pixel according to example 47, wherein said levels of emissivity are from about 0.01 to about 0.99.

Example 49. The electro-mechanical pixel according to example 47, wherein said plurality of filters are provided with different levels of roughness to amend said levels emissivity.

Example 50. The electro-mechanical pixel according to any one of examples 29-49, wherein said plurality of filters comprise thin sheets made of at least one material configured to be semi-transparent in the infrared spectrum.

Example 51. The electro-mechanical pixel according to example 50, wherein said at least one material being semi-transparent in the infrared spectrum provides reduced emissivity to said plurality of filters.

Example 52. The electro-mechanical pixel according to example 50, wherein said at least one material are plastic materials.

Example 53. The electro-mechanical pixel according to example 47, wherein said materials are one or more of alumel, aluminum, aluminum oxide, asbestos, asphalt, basalt, bismuth, brass, carbon, carborundum, ceramic, clay, concrete, chromel, chromium, cobalt, columbium, copper, enamel, formica, mullite, glass, gold, granite, gravel, gypsum, iron, iron oxide, lacquer, lead, limestone, magnesium oxide, molybdenum, monel, nichrome, nickel, nickel oxide, oil, paint, paper, plaster, plastic, platinum, polyester, polyethylene, quartz, rubber, sand, sandstone, shale, silica, silicone carbide, silver, slate, stainless steel, steel, tantalum, textiles, tine, tungsten, wood and zinc.

Example 54. The electro-mechanical pixel according to any one of examples 29-53, wherein said plurality of filters are made of materials that are one or more of microwave absorbers and microwave reflective.

Example 55. The electro-mechanical pixel according to any one of examples 29-54, wherein said plurality of filters are made of materials comprising embedded micro and/or macro materials, like crystals, metals, polymers and fibers.

Example 56. The electro-mechanical pixel according to any one of examples 29-55, wherein said plurality of filters are configured to provide said pixel with either a higher or a lower radar cross-section.

Example 57. A spiral electro-mechanical pixel, comprising:
    a. a storage compartment comprising:
        i. a plurality of filters;
        ii. an electronic module, comprising:
            A. one or more motors configured for independently moving each filter from said plurality of filters from within said storage compartment into an exhibit area;
            B. circuitry configured to actuate said one or more motors;
    b. an exhibit area configured to allow one or more of said plurality filter to be seen;
wherein movement of said plurality of filters from said storage compartment to said exhibit area is characterized by a rotational movement along a longitudinal axis of the pixel, which is perpendicular to a direction of a surface of said storage compartment.

Example 58. The spiral electro-mechanical pixel according to example 57, wherein said storage compartment comprises a housing sized and shaped to store said a plurality of filters and said electronic module.

Example 59. The spiral electro-mechanical pixel according to example 57 or example 58, further comprising a central shaft located in said storage compartment and extending perpendicularly to said storage compartment.

Example 60. The spiral electro-mechanical pixel according to example 59, wherein said central shaft is positioned along said longitudinal axis.

Example 61. The spiral electro-mechanical pixel according to example 59, wherein said rotational rotation is performed over said central shaft.

Example 62. The spiral electro-mechanical pixel according to example 61, wherein said plurality of filters are sized and shaped to fit a form of said storage compartment.

Example 63. The spiral electro-mechanical pixel according to example 61, wherein said rotational movement allows one or more of said plurality of filters to cover between 0% and 100% of said exhibit area.

Example 64. The spiral electro-mechanical pixel according to example 61, wherein said exhibit area further comprise a neutral protective layer configured to protect said plurality of filters when located in said exhibit area.

Example 65. The spiral electro-mechanical pixel according to example 61, wherein said storage compartment comprises an hexagonal form.

Example 66. The spiral electro-mechanical pixel according to example 61, wherein each filter of said plurality of filters is divided in at least two parts.

Example 67. The spiral electro-mechanical pixel according to example 66, wherein said at least two parts are configured to have superimposed areas with each other.

Example 68. The spiral electro-mechanical pixel according to any one of examples 57-67, wherein parts of filters are intercalated with parts of other filters within the same spiral electro-mechanical pixel.

Example 69. The spiral electro-mechanical pixel according to any one of examples 57-68, wherein said plurality of filters are stacked one on top of another.

Example 70. The electro-mechanical pixel according to any one of examples 57-69, wherein said plurality of filters are chromatic filters.

Example 71. The electro-mechanical pixel according to any one of examples 57-70, wherein said plurality of filters are configured to provide one or more colors.

Example 72. The electro-mechanical pixel according to example 71, wherein said one or more colors are selected from the group consisting of green, red, blue, yellow, cyan and magenta.

Example 73. The electro-mechanical pixel according to any one of examples 57-72, wherein said plurality of filters comprise one or more of polarizers, reflective filters, refractive filters and optical elements.

Example 74. The electro-mechanical pixel according to any one of examples 57-73, wherein each filter from said plurality of filters is characterized by a percentage of transmission for all of the wavelength ranges but one.

Example 75. The electro-mechanical pixel according to any one of examples 57-74, wherein each filter from said plurality of filters is characterized by a 100% transmission for one wavelength range.

Example 76. The electro-mechanical pixel according to any one of examples 57-75, wherein combinations between said filters from said plurality of filters allows said pixel to provide a transmission between 0% and 100% for each wavelength range.

Example 77. The electro-mechanical pixel according to any one of examples 57-76, further comprising at least one background filter positioned behind said filters in said exhibiting area.

Example 78. The electro-mechanical pixel according to example 77, wherein said background filter comprises a color selected from the group consisting of white, black, gray and shades in between.

Example 79. The electro-mechanical pixel according to any one of examples 57-78, wherein said plurality of filters are made of materials having different levels of emissivity.

Example 80. The electro-mechanical pixel according to example 79, wherein said levels of emissivity are from about 0.01 to about 0.99.

Example 81. The electro-mechanical pixel according to example 79, wherein said plurality of filters are provided with different levels of roughness to amend said levels emissivity.

Example 82. The electro-mechanical pixel according to any one of examples 57-81, wherein said plurality of filters comprise thin sheets made of at least one material configured to be semi-transparent in the infrared spectrum.

Example 83. The electro-mechanical pixel according to example 82, wherein said at least one material being semi-transparent in the infrared spectrum provides reduced emissivity to said plurality of filters.

Example 84. The electro-mechanical pixel according to example 82, wherein said at least one material are plastic materials.

Example 85. The electro-mechanical pixel according to example 77, wherein said materials are one or more of alumel, aluminum, aluminum oxide, asbestos, asphalt, basalt, bismuth, brass, carbon, carborundum, ceramic, clay, concrete, chromel, chromium, cobalt, columbium, copper, enamel, formica, mullite, glass, gold, granite, gravel, gypsum, iron, iron oxide, lacquer, lead, limestone, magnesium oxide, molybdenum, monel, nichrome, nickel, nickel oxide, oil, paint, paper, plaster, plastic, platinum, polyester, polyethylene, quartz, rubber, sand, sandstone, shale, silica, silicone carbide, silver, slate, stainless steel, steel, tantalum, textiles, tine, tungsten, wood and zinc.

Example 86. The electro-mechanical pixel according to any one of examples 57-85, wherein said plurality of filters are made of materials that are one or more of microwave absorbers and microwave reflective.

Example 87. The electro-mechanical pixel according to any one of examples 57-86, wherein said plurality of filters are made of materials comprising embedded micro and/or macro materials, like crystals, metals, polymers and fibers.

Example 88. The electro-mechanical pixel according to any one of examples 57-87, wherein said plurality of filters are configured to provide said pixel with either a higher or a lower radar cross-section.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1a, 1b, 1c, 1d, 1e and 1f are schematic representations of exemplary linear pixels, according to some embodiments of the invention;

DESCRIPTION OF SPECIFIC EMBODIMENTS OF THE INVENTION

Figure 1E:
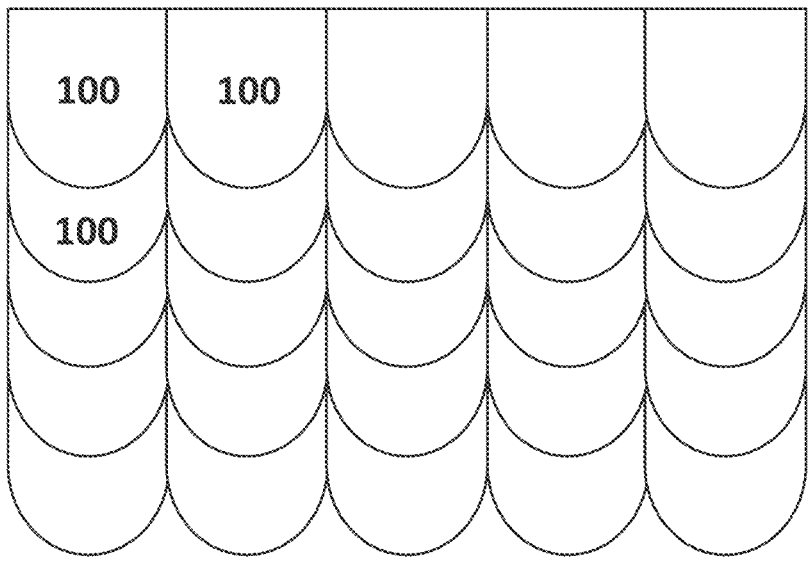

The present invention, in some embodiments thereof, relates to an electro-mechanical pixel and, more particularly, but not exclusively, to an electro-mechanical pixel.

Overview

An aspect of some embodiments of the invention relates to electro-mechanical adaptive pixels. In some embodiments, the pixel comprises a plurality of interchangeable and combinable filters to enable an external effect in one or more spectrums. In some embodiments, the external effect includes one or more of: an effect in the visible spectrum, an effect in the infrared spectrum and an effect in the microwave spectrum. In some embodiments, the filters are made of pigment-based materials configured to reflect color with high levels of precision. In some embodiments, the filters comprise a level of transparency. In some embodiments, transparency levels of each filter enable superimpose different filters to provide a plurality of different reflective surfaces, therefore reflecting a plurality of different colors. In some embodiments, the filters of the pixels are made of materials having different levels of emissivity. In some embodiments, the pixels comprise filters having materials that are one or more of microwave absorbers and microwave reflective. In some embodiments, the pixels are flat. In some embodiments, the pixels are concave. In some embodiments, the pixels comprise dedicated forms which allow organization of the pixels on a surface. In some embodiments, the organization is sporadic, meaning the pixels are positioned in sporadic positions over the surface without a repetitive pattern. In some embodiments, the pixels are organized following a pattern on a surface. In some embodiments, the pixels are positioned one adjacent to the other. In some embodiments, there are spaces between pixels. In some embodiments, the pixels are very thin, for example, the pixel comprise a thickness of from about 0.5 mm to about 5 cm.

An aspect of some embodiments of the invention relates to electro-mechanical adaptive pixels comprising a plurality of layers that allow to independently control visible light, thermal IR, millimeter waves, microwaves and radar. In some embodiments, to independently control the absorption and/or reflection of widely different wavelength ranges, the pixel comprises a plurality of layers and/or filters configured to be independently interchangeable and/or superimposed. In some embodiments, each layer/filter is responsible to absorb/reflect a different wavelength range. In some embodiments, each layer/filter is transparent to all the other wavelength ranges.

In some embodiments, any of the electro-mechanical adaptive pixels are used in a low energy mixer of shapes and waves that can create accurate results with 99.5% surface cover.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Principle of the Invention

In some embodiments, the invention relates to a device comprising a plurality of interchangeable and combinable filters to enable an external effect. In some embodiments, the external effect includes one or more of: an effect in the visible spectrum, an effect in the infrared spectrum and an effect in the microwave spectrum (see below dedicated explanations for each effect). In some embodiments, the plurality of filters are incorporated within a device configured to dynamically interchange and/or combine the plurality of filters in order to provide the desired effect. In some embodiments, such device will be referred hereinafter as a "pixel". In some embodiments, a plurality of pixels are positioned one near another in order to provide a surface capable of providing an effect. In some embodiments, such device comprising a plurality of pixels will be referred hereinafter as display surface. In some embodiments, as mentioned above, the overall controlled activation of the plurality of pixels within a display surface provides the external effect. In some embodiments, the display surface comprises a stiff surface that does not allow the display surface to fold, providing for example a board. In some embodiments, the display surface comprises a bendable surface that allows the surface to bend when the display surface is positioned over another object, for example like a blanket. In some embodiments, in general, a pixel comprises three main components: an electronic module, a storage compartment and an exhibiting area. In some embodiments, the electronic module comprises circuitry, motors and electronics configured to actuate the plurality of filters housed within the storage compartment. In some embodiments, the storage compartment is configured to house the plurality of filters while not in use. In some embodiments, the exhibiting area is the part of the pixel that enables the plurality of filters to be seen and/or exposed to the external environment. In some embodiments, the exhibiting area optionally comprises a housing having a window and/or an opening that allows access to the filter to the external environment. In some embodiments, the housing of the exhibiting area comprises a protective cover configured to protect the plurality of filters while being exposed. In some embodiments, the protective cover is a neutral cover configured to not affect the effect provided by the filters. In some embodiments, filters are kept within the storage compartment until needed, and then they are spatially moved towards the exhibiting area or towards the window and/or opening in the housing of the exhibiting area, when the optional housing is used.

Exemplary Pixel Devices

In some embodiments, a pixel device can be one or more of a linear pixel, a shell-like pixel, a tube pixel, a ball-like pixel, a tube-like pixel and a spiral pixel. In the following paragraphs, each of these exemplary embodiments of pixels will be explained. Similar parts will have same name and functions. It should be understood that in the context of an explanation of one embodiment, the information disclosed from another embodiment in relation to at least the function of the same parts, is true for those embodiments, unless explicitly mentioned.

Exemplary Linear Pixel

Referring now to FIGS. 1a and 1b, showing a schematic front view representation and a schematic side view representation, respectively, of an exemplary linear pixel 100, and to FIGS. 1c and 1d, showing images of exemplary linear pixels, according to some embodiments of the invention. In some embodiments, a linear pixel 100 comprises 4 main parts: an electronic module 102, a storage compartment 104, an exhibiting area 106 and a plurality of filters 108.

Exemplary Electronic Module

In some embodiments, the electronic module 102 comprises one or more motors configured to independently actuate each of the plurality of filters. In some embodiments, the electronic module 102 comprises one or more control units comprising circuitry configured to control the movement of the one or more motors. In some embodiments, the one or more control units receive commands from a main control unit configured to actuate a plurality of pixels within a display surface. In some embodiments, the electronic module comprises a dedicated power source. In some embodiments, the electronic module receives power from an external, optionally centralized, power source, configured to provide power to a plurality of pixels within a display surface.

Exemplary Storage Compartment 104

In some embodiments, the storage compartment 104 is configured to house the plurality of filters and configured to visually block un-used filter to the external environment. In some embodiments, storage compartment 104 does not comprise a top surface and adjacent pixels perform the act of covering instead of the top surface of the storage compartment 104.

Exemplary Exhibiting Area

In some embodiments, the exhibit area 106 optionally comprises a housing 114 in which the filters are moved within. In some embodiments, the housing 114 of the exhibit area 106 comprises a window and/or opening 110 which allows one or more filters 108 from the plurality of filters to be exposed to the external environment and therefore provide a desired effect. In some embodiments, the optional housing comprises a protective surface on the area of the window and/or opening 100 configured to protect the filters being moved therein. In some embodiments, the protective surface is a neutral protective surface that does not influence the visual effect of the pixel.

Exemplary Filter

In some embodiments, an exemplary filter comprises a dedicated form adapted to fit the form of the storage compartment 104 and the optional housing of the exhibit area 106, when using a housing. In some embodiments, each filter comprises a dedicated connector 116, in FIG. 1d is shown as an elongated body extending from the main body of the filter. In some embodiments, the connector 116 is in mechanical communication with at least one motor of the one or more motors. In some embodiments, actuation of a motor, either pulls or pushes the connector, which moves (deploys) the filter from storage compartment 104 into the exhibit area 106, and from the exhibit area 106 back into the storage compartment 104. In some embodiments, the one or more motors are linear motors that linearly actuate the connectors and therefore the linear movement of the filters.

In some embodiments, a different of connector is used to connect between a filter and the one or more motors that actuate the filter. In some embodiments, the location of the connector can be at any location along the sides of the parts that are connected with each other, for example, on the middle, on the side, etc.

Exemplary General Information about the Exemplary Linear Pixel

In some embodiments, the linear pixel 100 optionally comprises one or more hinges 112 located between the electronic module 102 and storage compartment 104. In some embodiments, the one or more hinges 112 allow a relative movement of the electronic module 102 in relation to the storage compartment 104. In some embodiments, the movement is from about 0 degrees—straight configuration as shown for example in FIG. 1*c*—to about 180 degrees—completely folded configuration as shown for example in FIG. 1*d*.

In some embodiments, the linear pixel 100, as its name indicates, is configured to reversibly and linearly move the filters from within the storage compartment 104 into the exhibit area 106 and back, as schematically shown in FIG. 1*b*.

Figure 1F:
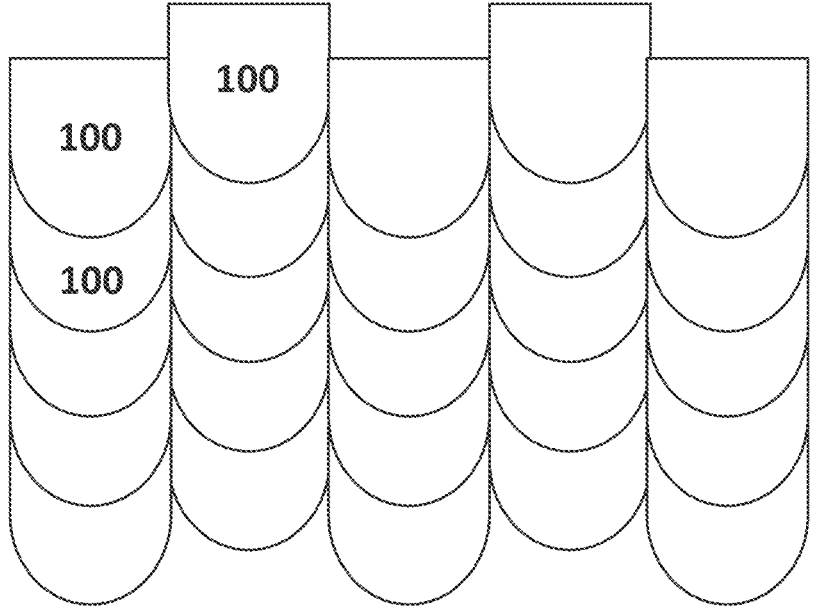

In some embodiments, a plurality of linear pixels are arranged, optionally comprising an angle between them provided by the one or more hinges 112, one near the other and/or one above/below another, to generate a display surface. In some embodiments, a display surface comprises a plurality of rows and columns of pixels which define the area of the display surface. In some embodiments, when one pixel is above another, the exhibit area 106 of the pixel located above will be placed so as to be above the storage compartment 104 of the pixel below. In some embodiments, a plurality of arranged pixels generate a mosaic of pixels where mostly or only the exhibit areas 106 of the plurality of pixels can be seen. In some embodiments, the rows/columns of the plurality of pixels are perfectly aligned between each other, as shown for example in FIG. 1*e*. In some embodiments, the rows/columns of the plurality of pixels are not perfectly aligned, as shown for example in FIG. 1*f*, showing un-aligned pixels.

In some embodiments, the form of the linear pixel is as shown for example in FIGS. 1*a*, 1*c* and 1*d*, which is an elongated filter with a circular end. In some embodiments, the form of the filter can have any geometry and/or form, for example, triangular end, square end, etc.

In some embodiments, the velocity of the movement of the filters, meaning the time that it takes for a filter to be completely deployed, is from about 0.5 seconds to about 1 second. Optionally, from about 0.2 seconds to about 1.5 seconds. Optionally, from about 0.1 seconds to about 2 seconds. In some embodiments, the pixel is configured to partially deploy a filter, for example, a certain filter can be deployed half way (or any other distance) into the exhibit element 106. In some embodiments, exemplary linear pixels comprise a size of from about 10 mm to about 200 mm. Optionally from about 5 mm to about 400 mm. Optionally from about 1 mm to about 1000 mm.

Exemplary Shell-Like Pixel

Figure 2A:
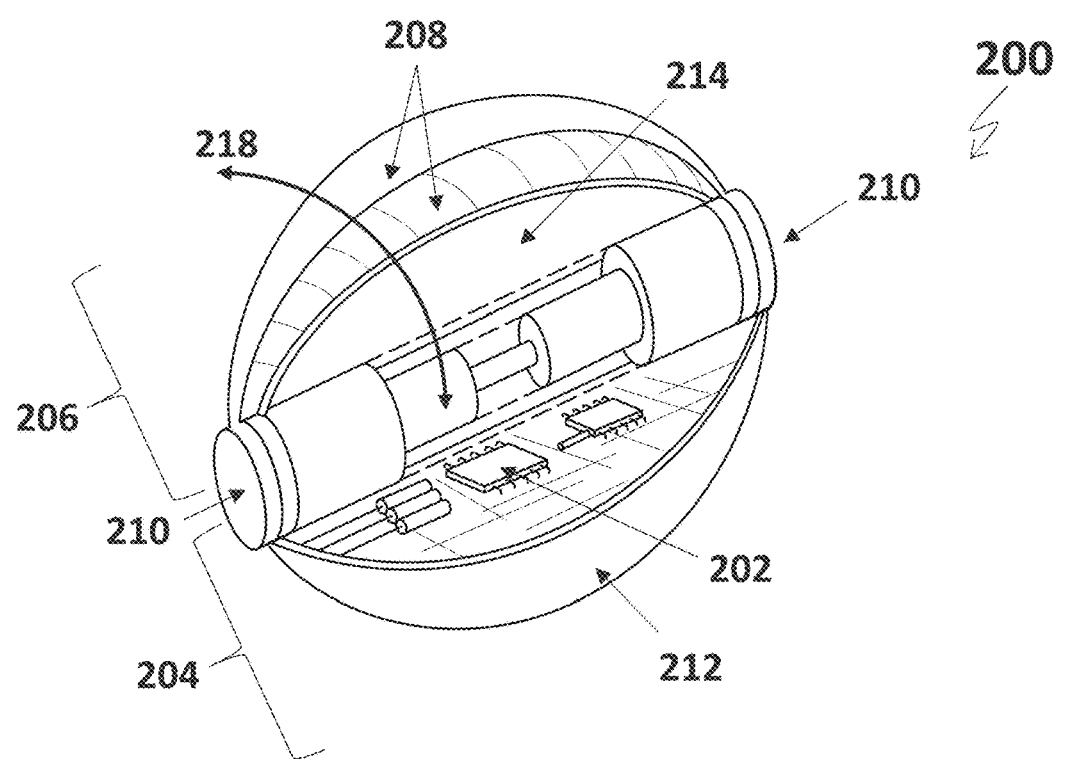
FIGS. 2a, 2b, 2c and 2d are schematic representations of exemplary shell-like pixels, according to some embodiments of the invention.
Figure 2B:
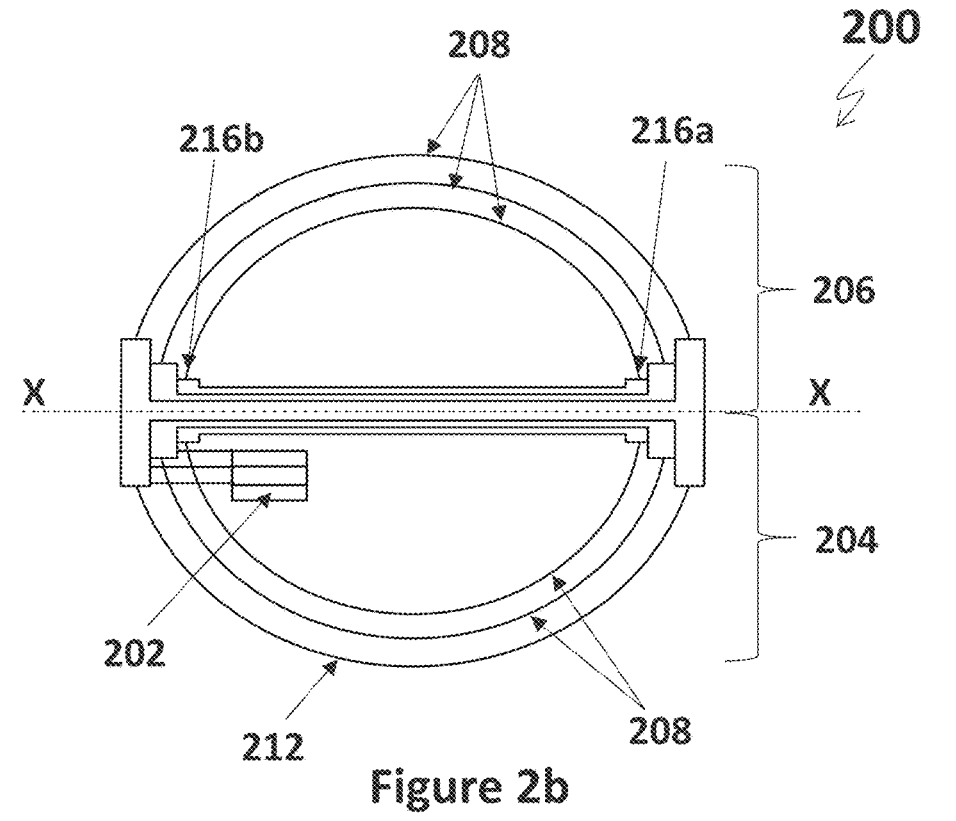

Referring now to FIGS. 2*a-b*, showing a schematic representation of an exemplary shell-like pixel 200, according to some embodiments of the invention. In some embodiments, similar to the linear pixel disclosed above, an exemplary shell-like pixel 200 comprises 4 main parts: an electronic module 202, a storage compartment 204, an exhibiting area 206 and a plurality of filters 208. In some embodiments, in addition, the shell-like pixel comprises an optional main shaft 210. In some embodiments, the shell-like pixel is a sphere having two main zones: a closed bottom configured to house electronics, motors and a plurality of half-spherical filters, which corresponds to the storage compartment 204; and an "open" top configured to allow filters to be exposed to the external environment, which corresponds to the exhibiting area 206. In some embodiments, the open top, meaning the open side of the exhibiting area 206, is covered by a neutral (meaning that does not affect the desired effect provided by the filters) protective layer configured to protect the moving filters. In some embodiments, the filters are half-spherical filters that can be completely housed within the closed bottom (the storage compartment 204) of the shell-like pixel 200. In some embodiments, half-spherical filters are attached to the optional main shaft 210, which provides the axis of rotation. In some embodiments, half-spherical filters are attached to one or more motors, optionally electrical motors, configured to rotate, optionally individually, the filters (without the need of main shaft). In some embodiments, half-spherical filters are deployed by rotating them and moving them from the storage compartment 204 towards the exhibiting area 206 of the shell-like pixel 200.

Exemplary Electronic Module

In some embodiments, the electronic module 202 comprises one or more motors configured to independently actuate each of the plurality of filters 208 by actuating independent parts in the main shaft 210. In some embodiments, the actuation of the filters is by actuating electrical motors, and there is no main shaft (see below). In some embodiments, the electronic module 202 comprises circuitry and one or more control units configured to control the movement of the one or more motors. In some embodiments, the one or more control units receive commands from a main control unit configured to actuate a plurality of pixels within a display surface. In some embodiments, the electronic module comprises a dedicated power source. In some embodiments, the electronic module receives power from an external, optionally centralized, power source, configured to provide power to a plurality of pixels within a display surface.

Exemplary Storage Compartment

In some embodiments, the storage compartment 204, which is the closed bottom half of the shell-like pixel 200, is configured to house the plurality of filters and configured to block from below un-used filter to the external environment. In some embodiments, additionally, the storage compartment 204 is configured to house the electronic module 202 within. In some embodiments, the storage compartment 204 is hard and it is configured to protect the internal components of the shell-like pixel 200.

Exemplary Exhibiting Area

In some embodiments, the exhibit area 206, which is the open top half of the shell-like pixel 200, is a window and/or opening 214 which allows one or more filters 208 from the plurality of filters to be exposed to the external environment and therefore provide a desired effect.

Exemplary Filters

In some embodiments, an exemplary filter comprises a dedicated form adapted to fit the form of the storage compartment 204 and/or the window and/or opening 214 of the exhibit area 206. In some embodiments, the dedicated form is of a half shell and or half-spherical and/or convex shape. In some embodiments, each filter comprises two dedicated connectors 216*a-b* configured to connect the filter to either the main shaft 210 or directly to the motors. In some embodiments, the one or more motors actuate the connectors in order to rotate the filter and rotationally move it from within the storage compartment 204 to the window and/or opening 214 of the exhibit area 206, as schematically shown by arrow 218 in FIG. 2*a*. In some embodiments, the rotation of the filter is along the longitudinal axis X-X of the pixel, as schematically shown in FIG. 2*b*. In some embodiments, the rotation of the filter is along the longitudinal axis X-X of the main shaft 210. In some embodiments, the one or more motors are rotational motors, optionally electrical motors, which rotationally actuate the connectors (without the need of a main shaft).

Exemplary General Information about the Exemplary Shell-Like Pixel

In some embodiments, the shell-like pixel 200 is configured to reversibly and rotationally move the filters from within the storage compartment 204 into the window and/or opening of the exhibit area 206 and back.

Figure 2C:
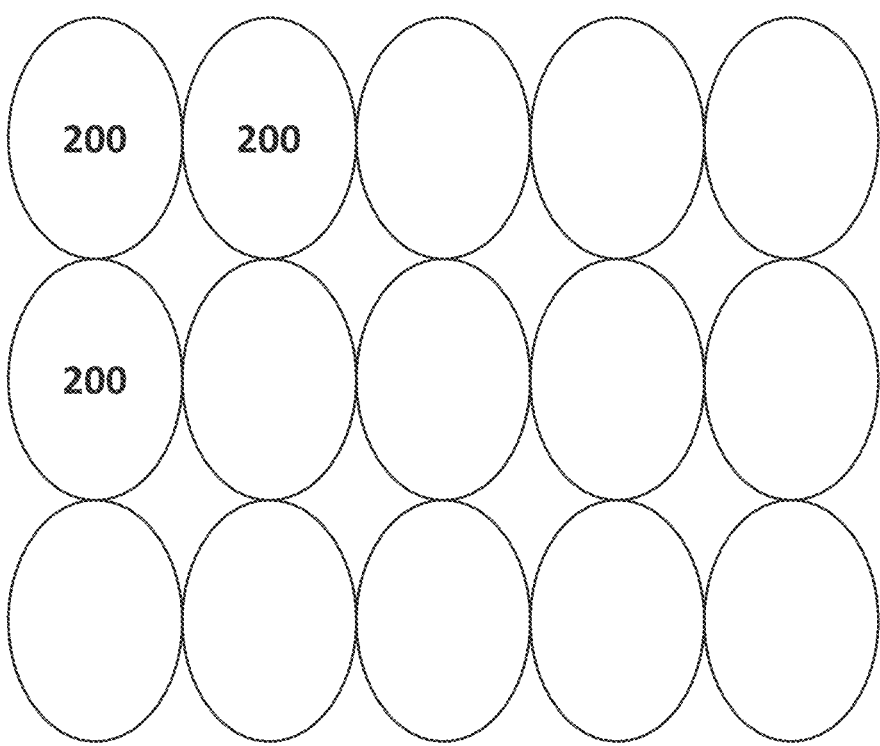
Figure 2D:
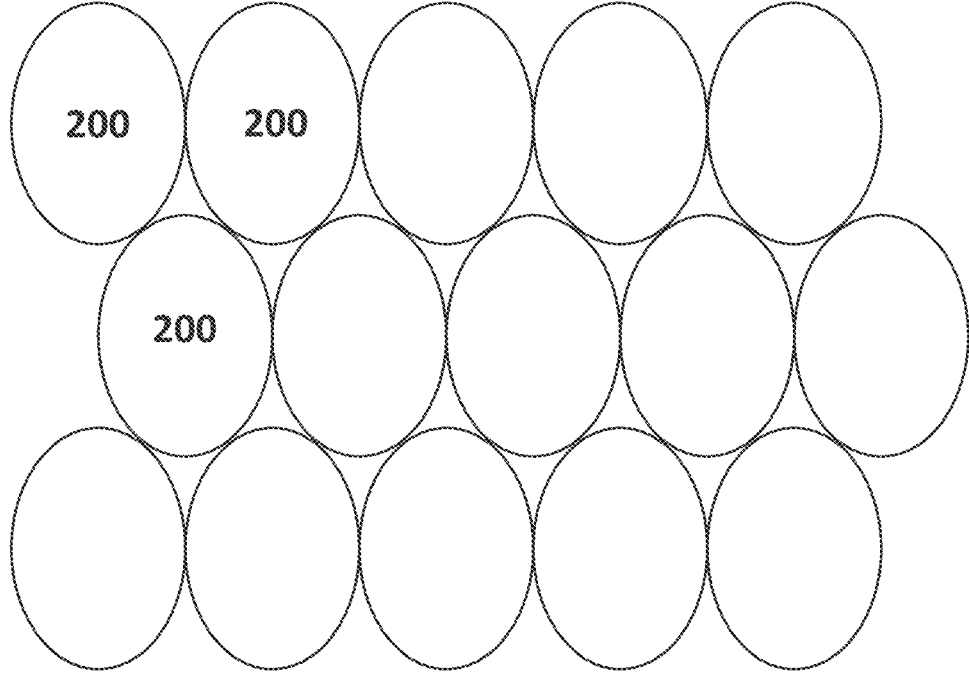

In some embodiments, a plurality of shell-like pixels are arranged one near the other to generate a display surface. In some embodiments, a display surface comprises a plurality of rows and columns of pixels which define the area of the display surface. In some embodiments, contrary to the linear pixel 100, the shell-like pixel does not require superimposing pixels in order to avoid gaps within the display surface. In some embodiments, since the shell-like pixel comprise an oval form, a plurality of adjacent shell-like pixels can be arranged to generate an almost or complete display surface without gaps. In some embodiments, a plurality of arranged pixels generate a mosaic of pixels where mostly or only the windows and/or openings of the exhibit areas 206 of the plurality of pixels can be seen. In some embodiments, the shell-like pixels can be arranged with a separation from each other. In some embodiments, the rows/columns of the plurality of pixels are perfectly aligned between each other, as shown for example in FIG. 2*c*. In some embodiments, the rows/columns of the plurality of pixels are not perfectly aligned, as shown for example in FIG. 2*d*, showing intercalated pixels.

In some embodiments, the shell-like pixel is circular and/or oval, as shown for example in FIGS. 2*a*-2*d*. In some embodiments, the shell-like pixel can have a square form, or a prism form, or any other geometrical form which allows for the correct operation of the pixel as described herein. In some embodiments, the surface of the bottom part comprises a color. In some embodiments, only part of the surface of the bottom part comprises a color. In some embodiments, the surface of the bottom part comprises a pattern, optionally a colored pattern.

In some embodiments, the velocity of the movement of the filters, meaning the time that it takes for a filter to be completely deployed, is from about 0.5 seconds to about 1 second. Optionally, from about 0.2 seconds to about 1.5 seconds. Optionally, from about 0.1 seconds to about 2 seconds. In some embodiments, the shell-like pixel is configured to partially deploy a filter, for example, a certain filter can be deployed half way (or any other distance) into the exhibit area 206. In some embodiments, exemplary shell-like pixels comprise a size of from about 10 mm to about 200 mm. Optionally from about 5 mm to about 400 mm. Optionally from about 1 mm to about 1000 mm.

Exemplary Tube Pixel

Figure 2E:
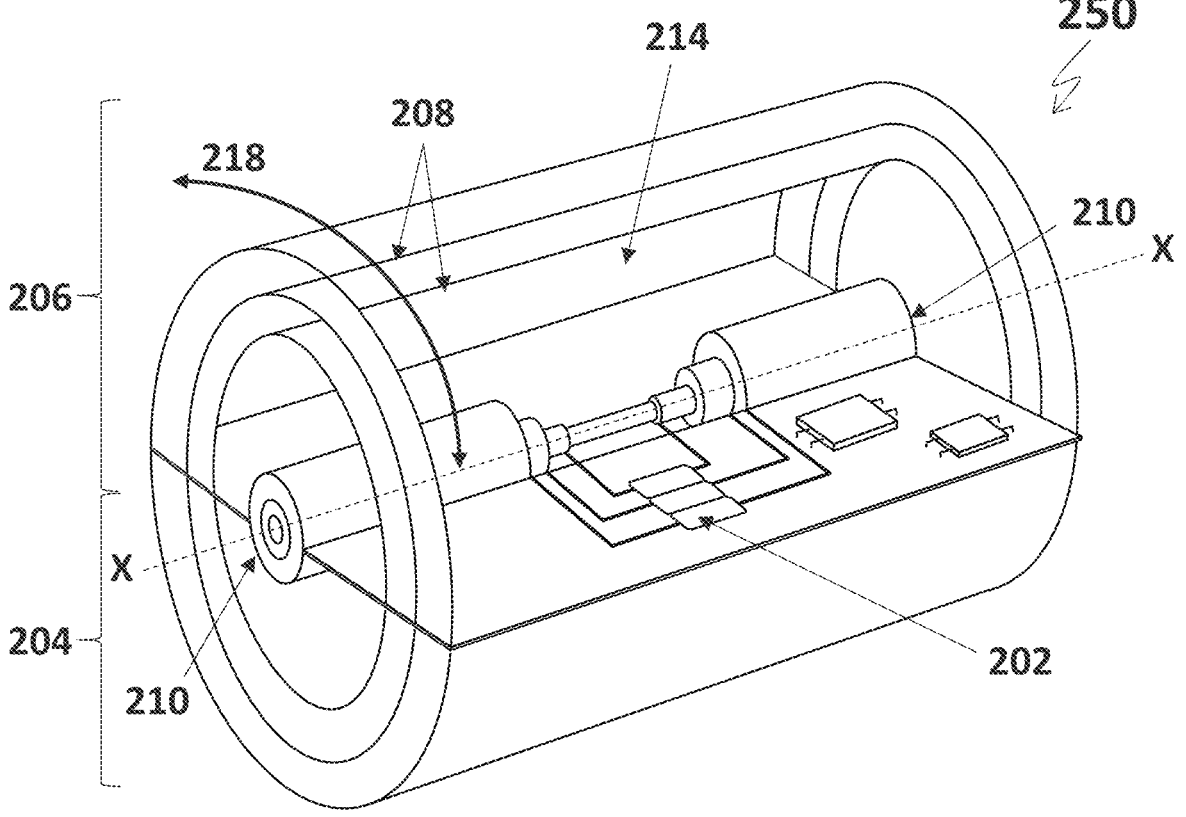
FIG. 2e is a schematic representation of an exemplary tube pixel, according to some embodiments of the invention.

Referring now to FIG. 2*e*, showing a schematic representation of an exemplary tube pixel, according to some embodiments of the invention. In some embodiments, the tube pixel is similar in the configuration as the shell-like pixel, but instead of having a shell-like form it has a tube form. Similar parts have similar reference numbers.

In some embodiments, similar to the shell-like pixel disclosed above, an exemplary tube pixel 250 comprises 4 main parts: an electronic module 202, a storage compartment 204, an exhibiting area 206 and a plurality of filters 208. In some embodiments, in addition, the tube pixel comprises a main shaft 210. In some embodiments, the tube pixel is a tube having two main zones: a closed bottom 204, configured to house electronics, motors and a plurality of filters, which corresponds to the storage compartment 204; and an "open" top configured to allow filters to be exposed to the external environment which corresponds to the exhibiting area 206. In some embodiments, the open top, meaning the open side of the exhibiting area 206, is covered by a neutral (meaning that does not affect the desired effect provided by the filters) protective layer configured to protect the moving filters. In some embodiments, the filters comprise a convex form, optionally a form of tube or a partial tube that are configured to be completely housed within the closed bottom of the tube pixel 250. In some embodiments, the filters are attached to a main shaft 210, which provides the axis of rotation. In some embodiments, the filters are attached to one or more motors, optionally electrical motors, configured to rotate, optionally individually, the filters (without the need of main shaft). In some embodiments, the filters are deployed by rotating them and moving them towards the open top of the tube pixel 250.

Exemplary Electronic Module

In some embodiments, the electronic module 202 comprises one or more motors configured to independently actuate each of the plurality of filters 208 by actuating independent parts in the main shaft 210. In some embodiments, the actuation of the filters is by actuating electrical motors, and there is no main shaft (see below). In some embodiments, the electronic module 202 comprises circuitry and one or more control units configured to control the movement of the one or more motors. In some embodiments, the one or more control units receive commands from a main control unit configured to actuate a plurality of pixels within a display surface. In some embodiments, the electronic module comprises a dedicated power source. In some embodiments, the electronic module receives power from an external, optionally centralized, power source, configured to provide power to a plurality of pixels within a display surface.

Exemplary Storage Compartment

In some embodiments, the storage compartment 204, which is the closed bottom half of the tube pixel 250, is configured to house the plurality of filters and configured to block from below un-used filter to the external environment. In some embodiments, additionally, the storage compartment 204 is configured to house the electronic module 202 within. In some embodiments, the storage compartment 204 is hard and it is configured to protect the internal components of the tube pixel 250.

Exemplary Exhibiting Area

In some embodiments, the exhibit area 206, which is the open top half of the tube pixel 250, is a window and/or opening 214 which allows one or more filters 208 from the plurality of filters to be exposed to the external environment and therefore provide a desired effect.

Exemplary Filter

In some embodiments, an exemplary filter comprises a dedicated form adapted to fit the form of the storage compartment 204 and the window and/or opening 214 of the exhibit area 206. In some embodiments, each filter comprises two dedicated connectors configured to connect the filter to the main shaft 210. In some embodiments, the one or more motors actuate the connectors in order to rotate the filter and rotationally move it from within the storage compartment 204 to the window and/or opening 214 of the exhibit area 206, as schematically shown by arrow 218 in FIG. 2e. In some embodiments, the rotation of the filter is along the longitudinal axis X-X of the pixel, as schematically shown in FIG. 2e. In some embodiments, the rotation of the filter is along the longitudinal axis X-X of the main shaft 210, as schematically shown in FIG. 2e. In some embodiments, the one or more motors are rotational motors, optionally electrical motors, which rotationally actuate the connectors (without the need of a main shaft).

Exemplary Shaft-Less Mechanism

In FIGS. 2a-2b in regards to the shell-like pixel 200 and in FIG. 2e in regards to the tube pixel 250, a shaft 210 is shown. In some embodiments, the pixel (either shell-like pixel or tube pixel) is a shaft-less pixel. In some embodiments, instead of having a shaft, the pixel comprises one or more motors, optionally electrical motors, to which the filters are attached to and are configured to rotate, optionally individually, each filter. In some embodiments, a potential advantage of having a shaft-less pixel is that is saves space and allows to provide a smaller pixel.

Exemplary Spiral Pixel

Figure 3A:
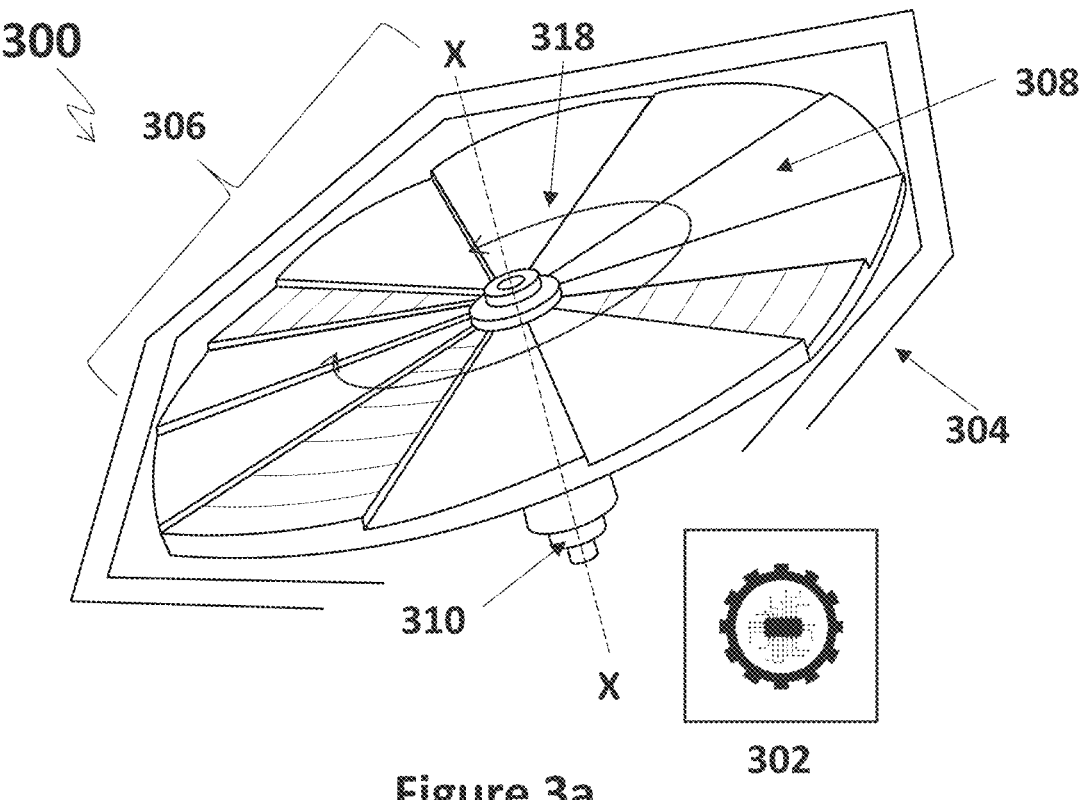
FIGS. 3a, 3b, 3c and 3d are schematic representations of exemplary spiral pixels, according to some embodiments of the invention.
Figure 3B:
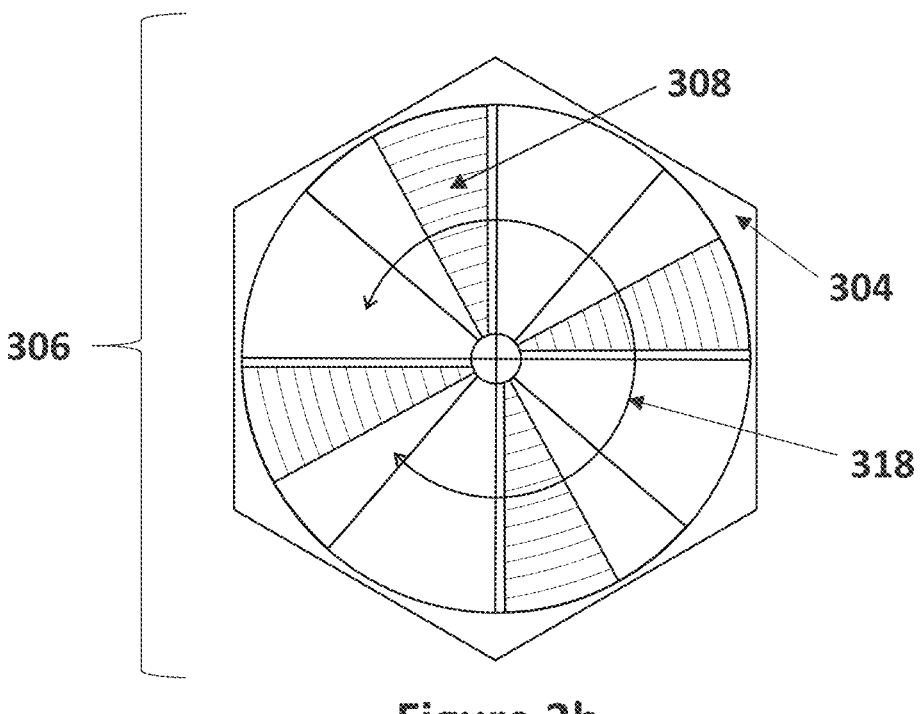
Figure 3C:
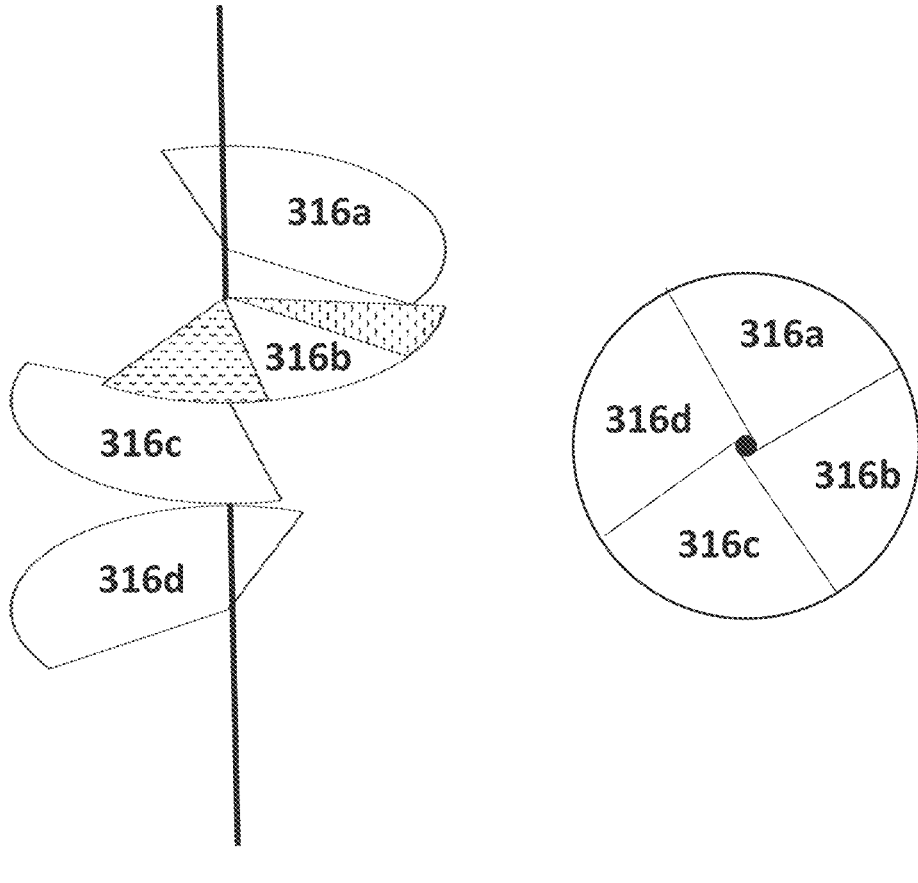

Referring now to FIGS. 3a-c, showing a schematic representation of an exemplary spiral pixel 300, according to some embodiments of the invention. In some embodiments, similar to the linear pixel, the shell-like pixel and the tube pixel disclosed above, an exemplary spiral pixel 300 comprises 4 main parts: an electronic module 302, a storage compartment 304, an exhibiting area 306 and a plurality of filters 308. In some embodiments, in addition and similar to shell-like pixel disclosed above, the spiral pixel optionally comprises a main shaft 310.

Exemplary Electronic Module

In some embodiments, the electronic module 302 comprises one or more motors configured to independently actuate each of the plurality of filters 308 by actuating independent parts in the main shaft 310. In some embodiments, the electronic module 302 comprises circuitry and one or more control units configured to control the movement of the one or more motors. In some embodiments, the one or more control units receive commands from a main control unit configured to actuate a plurality of pixels within a display surface. In some embodiments, the electronic module comprises a dedicated power source. In some embodiments, the electronic module receives power from an external, optionally centralized, power source, configured to provide power to a plurality of pixels within a display surface.

Exemplary Storage Compartment

In some embodiments, the storage compartment 304, which is a closed bottom part of the spiral pixel 300, is configured to house the plurality of filters and configured to block from below un-used filters to the external environment, from the bottom side of the pixel. In some embodiments, additionally, the storage compartment 304 is configured to house the electronic module 302 within. In some embodiments, the storage compartment 304 is hard and it is configured to protect the internal components of the spiral pixel 300.

Exemplary Exhibiting Area

In some embodiments, the exhibit area 306, which is an open top of the spiral pixel, is a window and/or opening, which allows one or more filters 308 from the plurality of filters to be exposed to the external environment and therefore provide a desired effect.

Exemplary Filter

Figure 3D:
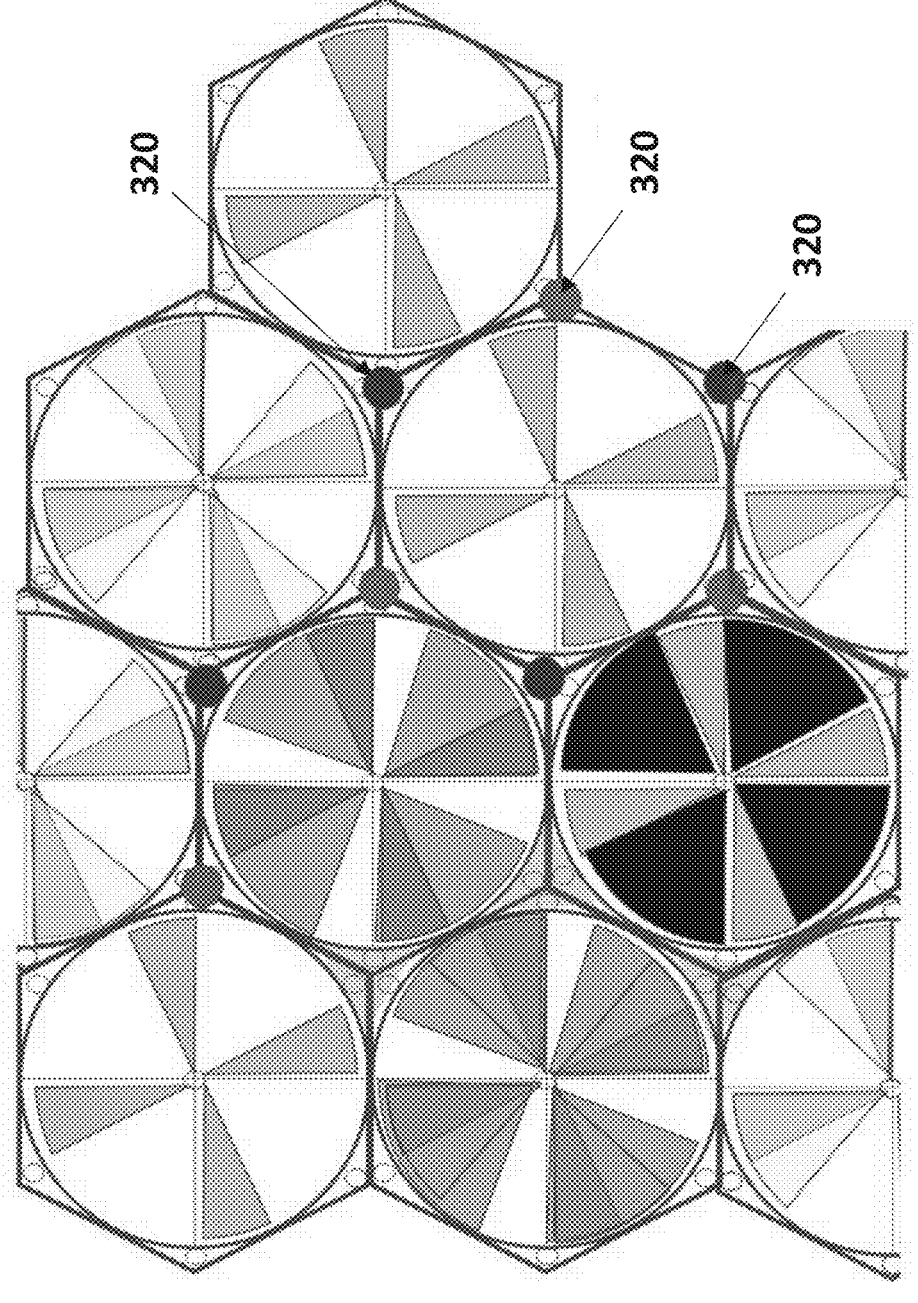

In some embodiments, an exemplary filter comprises a dedicated form adapted to fit the form of the storage compartment 304 and/or the window and/or opening 314 of the exhibit area 306. In some embodiments, the form of the filters and the form of the storage compartment are different, for example as shown in FIG. 3a, the filter comprises a circular form, while the storage compartment comprises a hexagonal form. In some embodiments, the dedicated form is of a circle divided into blades, similar for example, to those of a fan. In some embodiments, the blades of each filter comprise at least a total area of a circle but are composed of a plurality of blades having partially superimposed areas. For example, FIG. 3c shows a schematic perspective exploded view of a filter 308 comprising 4 blades 316a-d. While the top view shows a complete circle made of the 4 blades 316a-d, it can be seen in the schematic perspective exploded view that blades 316a-d comprise an area bigger than ¼ of a circle, thereby having superimposed areas (schematically shown on blade 316b as an example with dashed areas-right side superimposed with the upper blade 316a, while left side superimposed with the bottom blade 316c) between blades 316a-d. In some embodiments, each filter is connected to a connector in the main shaft 310. In some embodiments, the blades comprise an area of from about ⅓ of an area of a circle to about a ¼ of an areas of a circle. Optionally, the blades comprise an area of from about ½ of an area of a circle to about a ⅛ of an area of a circle. Optionally, the blades comprise an area of from about ½ of an area of a circle to about a ¹⁄₁₀ of an area of a circle. In some embodiments, the one or more motors individually actuate the connector of each individual filter in order to rotate the filter in relation to the rest of filters within the cover element 304, as schematically shown by arrow 318 in FIG. 3a and in FIG. 3b (showing a top view of the spiral pixel). In some embodiments, the rotation of the filter is along the longitudinal axis X-X of the main shaft 310, as schematically shown in FIG. 3a. In some embodiments, the rotation comprises rotation and upwards movement, similar of that of a screw. In some embodiments, the rotation comprises rotation and upwards or downwards movement, according to the direction of the rotation. In some embodiments, the one or more motors are rotational motors that individually rotate the connectors, and therefore the filters, along the longitudinal axis of the main shaft 310. In some embodiments, the plurality of filters 308 are intercalated with each other. In some embodiments, rotation of one or more specific filters provide superimposed filters providing a specific effect, for example, FIG. 3d shows a plurality of spiral pixels showing exemplary different degrees of exposure of different combination of filters, therefore providing different effects.

Exemplary General Information about the Exemplary Spiral Pixel

In some embodiments, the spiral pixel 300 is configured to reversibly and rotationally move the filters in order to superimpose one or more filters and achieve a desired effect.

In some embodiments, a plurality of spiral pixels are arranged one near the other to generate a display surface. In some embodiments, a display surface comprises a plurality of rows and columns of pixels which define the area of the display surface. In some embodiments, contrary to the linear pixel 100, the spiral pixel does not require superimposing pixels in order to avoid gaps within the display surface. In some embodiments, the storage compartment 304 of the spiral pixel 300 is provided with a hexagon form, thereby providing a spiral pixel with a hexagon form. In some embodiments, the hexagon form allow an optimized organization of a plurality of spiral pixels, as shown for example in FIG. 3d.

In some embodiments, the spiral pixel comprises additional elements 320 located between the pixels in the surface display, as shown for example in FIG. 3*d*. In some embodiments, the additional elements 320 are configured to enhance the desired effect of the display surface (see below regarding characteristics of the filters). In some embodiments, the additional elements can be applied to any type of pixel (linear, shell-like, tube or spiral).

In some embodiments, the velocity of the movement of the filters, meaning the time that it takes for a filter to be completely deployed, is from about 0.5 seconds to about 1 second. Optionally, from about 0.2 seconds to about 1.5 seconds. Optionally, from about 0.1 seconds to about 2 seconds. In some embodiments, the shell-like pixel is configured to partially deploy a filter, for example, a certain filter can be deployed half way. In some embodiments, exemplary spiral pixels comprise a size of from about 10 mm to about 200 mm. Optionally from about 5 mm to about 400 mm. Optionally from about 1 mm to about 1000 mm.
Exemplary Characteristics of the Filters and Related Desired Effects In some embodiments, as mentioned above, the pixels (any of the pixels disclosed above) comprise a plurality of interchangeable and combinable filters to enable an external effect. In some embodiments, the external effect includes one or more of: an effect in the visible spectrum, an effect in the infrared spectrum and an effect in the microwave spectrum (see below dedicated explanations for each effect). In some embodiments, a pixel can comprise all the necessary filters to provide an effect in any of the abovementioned external effects.
Exemplary Effect in the Visible Spectrum In some embodiments, the filters are configured to provide one or more colors as an external effect. In some embodiments, the one or more colors are generated by combining one or more filters. In some embodiments, the filters are configured to manipulate light. In some embodiments, the filters are chromatic filters having various pigments, colors, including but not limited to green, red, blue, while in other embodiments the one or more colors generated by the filters are yellow, cyan, magenta and/or other colors. In some embodiments, the filters comprise polarizers, reflective and/or refractive filters, and/or other optical elements. In some embodiments, each of the pixels (either linear, shell-like or spiral) comprise a background, such as but not limited to a white, black, gray and/or other shades of backgrounds. In some embodiments, the background may include tile, generally disposed behind the filters, such that the background is adapted to reflect incoming light onto the various filters so as display the desired color on that pixel in the display surface. In some embodiments, the light impinging onto the pixel may originate from natural sunlight or, alternatively, the light may originate from artificial light sources, such as projectors, fluorescents, other lamps, or other light sources disposed in the vicinity of the pixels. In some embodiments, the light impinging onto the pixel may originate from crystals, neon and/or metals.
Exemplary Effect in the Infrared Spectrum In some embodiments, the filters of the pixels are made of materials having different levels of emissivity. For the sake of clarity and without being bound to theory, emissivity is a measure of a material's radiating efficiency. An emissivity of 1.00 implies that the material is 100% efficient at radiating energy. An emissivity of 0.20 implies that the material radiates only 20% of that which it is capable of radiating.

In some embodiments, the materials of the filters are made of materials having an emissivity from about 0.01 to about 0.99. Optionally from about 0.1 to about 0.8. Optionally from about 0.5 to about 0.7. In some embodiments, the surface of the filters are provided with dedicated roughness or finish to amend the level emissivity of the filter. In some embodiments, the filters comprise thin sheets of material such as plastics, which are semi-transparent in the infrared, and therefore have reduced emissivity.

In some embodiments, a potential advantage of the invention is that it potentially provides a controllable external effect to an object when looked by an infrared device. For example, an object covered with a display surface having filters adapted to provide an external effect in the infrared spectrum could not be differentiated from the background in which the object is standing when seen with specialized infrared devices, like infrared cameras (For example FLIR).

In some embodiments, exemplary materials used for the filters are one or more of alumel (unoxidized, oxidized), aluminum (polished, oxidized, rough, anodized), aluminum oxide, asbestos, asphalt, basalt, bismuth, brass (polished, oxidized, burnished), carbon (unoxidized, filament, soot, coke, graphite), carborundum, ceramic, clay, concrete, chromel, chromium, cobalt, columbium (polished, oxidized), Copper (polished, oxidized), enamel, formica, mullite, glass, gold, granite, gravel, gypsum, iron, iron oxide, lacquer, lead, limestone, magnesium oxide, molybdenum, monel, nichrome, nickel, nickel oxide, oil, paint, paper, plaster, plastic, platinum, polyester, polyethylene, quartz, rubber, sand, sandstone, shale, silica, silicone carbide, silver, slate, stainless steel, steel, tantalum, textiles, tine, tungsten, wood and zinc, just to mention some.
Exemplary Effect in the Microwave Spectrum In some embodiments, the pixels comprise filters having materials that are one or more of microwave absorbers and microwave reflective. In some embodiments, the pixels comprise filters having materials comprising embedded micro and/or macro materials, like crystals, metals, polymers and fibers.

In some embodiments, the filters allow the display surface to provide an object covered with a display surface with either a higher or a lower radar cross-section.

In some embodiments, a potential advantage of the invention is that it potentially provides a controllable external effect to an object when looked by a microwave device, for example a radar. For example, an object covered with a display surface having filters adapted to provide an external effect in the microwave spectrum could not be differentiated from the background in which the object is standing when "seen", for example, with specialized microwave devices, like radars.
Exemplary Camouflage Uses In some embodiments, the pixels described above are used in order to camouflage a surface of an object. In some embodiments, the camouflage can be performed in visual spectrum and/or in the non-visual spectrum, for example in the IR spectrum and/or in the microwave spectrum. In some embodiments, the camouflage is a partial camouflage. In some embodiments, the camouflage is a complete camouflage. In some embodiments, the camouflage is a patterned camouflage. In some embodiments, the pixels are used for one or more of (not an exhaustive list) crypsis, often through a general resemblance to the background, high contrast disruptive coloration, eliminating shadow, countershading, transparency, silvering, countershading and mimesis.

As used herein with reference to quantity or value, the term "about" means "within ±20% of".

The terms "comprises", "comprising", "includes", "including", "has", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular forms "a", "an" and "the" include plural references unless the context clearly dictates otherwise. For example, the term "a compound" or "at least one compound" may include a plurality of compounds, including mixtures thereof.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An electro-mechanical pixel, comprising:
a. a storage compartment comprising a plurality of filters;
b. an exhibit area configured to allow one or more of said plurality filter to be seen;
c. an electronic module, comprising:
 i. one or more motors configured for independently moving each filter from said plurality of filters from within said storage compartment into said exhibit area;
 ii. circuitry configured to actuate said one or more motors;
 wherein said storage compartment and said electronic module being mechanically connected to each other by at least one connector.

2. The electro-mechanical pixel according to claim 1, wherein said exhibit area comprises a housing; said housing comprising at least one opening configured to allow said filters residing within said first housing to be seen.

3. The electro-mechanical pixel according to claim 1, wherein said at least one connector is at least one hinge located between said storage compartment and said electronic module.

4. The electro-mechanical pixel according to claim 1, wherein said at least one connector is a bendable connector configured to allow arrangement of said storage compartment and said electronic module at an angle of between about 0 degrees and about 180 degrees.

5. The electro-mechanical pixel according to claim 1, wherein movement of said plurality of filters is characterized by being a linear movement.

6. The electro-mechanical pixel according to claim 5, wherein said movement allows said filters cover between 0% and 100% of an area of said exhibit area.

7. The electro-mechanical pixel according to claim 1, further comprising a cover element.

8. The electro-mechanical pixel according to claim 1, wherein said plurality of filters are chromatic filters.

9. The electro-mechanical pixel according to claim 1, wherein said plurality of filters are configured to provide one or more colors; and wherein said one or more colors are selected from the group consisting of green, red, blue, yellow, cyan and magenta.

10. The electro-mechanical pixel according to claim 1, wherein said plurality of filters comprise one or more of polarizers, reflective filters, refractive filters and optical elements.

11. The electro-mechanical pixel according to claim 1, wherein each filter from said plurality of filters is characterized by a percentage of transmission for all of the wavelength ranges but one.

12. The electro-mechanical pixel according to claim 1, wherein each filter from said plurality of filters is characterized by a 100% transmission for one wavelength range.

13. The electro-mechanical pixel according to claim 1, wherein combinations between said filters from said plurality of filters allows said pixel to provide a transmission between 0% and 100% for each wavelength range.

14. The electro-mechanical pixel according to claim 1, further comprising at least one background filter positioned behind said filters in said exhibit area; and wherein said background filter comprises a color selected from the group consisting of white, black, gray and shades in between.

15. The electro-mechanical pixel according to claim 1, wherein said plurality of filters are made of materials having different levels of emissivity; wherein said levels of emissivity are from about 0.01 to about 0.99; and wherein said plurality of filters are provided with different levels of roughness to amend said levels emissivity.

16. The electro-mechanical pixel according to claim 1, wherein said plurality of filters comprise thin sheets made of at least one material configured to be semi-transparent in the infrared spectrum; wherein said at least one material being semi-transparent in the infrared spectrum provides reduced emissivity to said plurality of filters; wherein said at least one material are plastic materials; and wherein said materials are one or more of alumel, aluminum, aluminum oxide, asbestos, asphalt, basalt, bismuth, brass, carbon, carborundum, ceramic, clay, concrete, chromel, chromium, cobalt, columbium, copper, enamel, formica, mullite, glass, gold, granite, gravel, gypsum, iron, iron oxide, lacquer, lead, limestone, magnesium oxide, molybdenum, monel, nichrome, nickel, nickel oxide, oil, paint, paper, plaster, plastic, platinum, polyester, polyethylene, quartz, rubber, sand, sandstone, shale, silica, silicone carbide, silver, slate, stainless steel, steel, tantalum, textiles, tine, tungsten, wood and zinc.

17. The electro-mechanical pixel according to claim 1, wherein said plurality of filters are made of materials that are one or more of microwave absorbers and microwave reflective.

18. The electro-mechanical pixel according to claim 1, wherein said plurality of filters are made of materials comprising embedded micro and/or macro materials, like crystals, metals, polymers and fibers.

19. The electro-mechanical pixel according to claim 1, wherein said plurality of filters are configured to provide said pixel with either a higher or a lower radar cross-section.

\* \* \* \* \*